(12) United States Patent
Partanen et al.

(10) Patent No.: US 7,807,947 B2
(45) Date of Patent: *Oct. 5, 2010

(54) LASER SINTERING PROCESS CHAMBER GAS CURTAIN WINDOW CLEANSING IN A LASER SINTERING SYSTEM

(75) Inventors: Jouni P. Partanen, Santa Monica, CA (US); Ning Zheng, Santa Clarita, CA (US); Raymond J. Bishop, Santa Clarita, CA (US)

(73) Assignee: 3D Systems, Inc., Rock Hill, SC (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/125,401

(22) Filed: May 9, 2005

(65) Prior Publication Data
US 2006/0249485 A1 Nov. 9, 2006

(51) Int. Cl.
*B23K 26/12* (2006.01)
(52) U.S. Cl. ............ 219/121.86; 219/121.65; 219/121.66
(58) Field of Classification Search ............ 219/121.86, 219/121.65, 121.66, 121.63, 121.64, 121.85, 219/121.6
See application file for complete search history.

(56) References Cited

U.S. PATENT DOCUMENTS

| | | | | |
|---|---|---|---|---|
| 5,637,175 | A * | 6/1997 | Feygin et al. | 156/264 |
| 5,837,960 | A * | 11/1998 | Lewis et al. | 219/121.63 |
| 5,876,767 | A | 3/1999 | Mattes et al. | |
| 5,883,357 | A * | 3/1999 | Newman et al. | 219/121.67 |
| 6,902,246 | B2 * | 6/2005 | Varnon et al. | 347/1 |
| 6,930,278 | B1 * | 8/2005 | Chung et al. | 219/121.85 |
| 2002/0017514 | A1 | 2/2002 | Lambert | |
| 2002/0164432 | A1 * | 11/2002 | Hofmeister | 427/421 |
| 2003/0052105 | A1 * | 3/2003 | Nagano et al. | 219/121.83 |
| 2003/0100824 | A1 * | 5/2003 | Warren et al. | 600/407 |
| 2004/0200816 | A1 * | 10/2004 | Chung et al. | 219/121.83 |
| 2005/0042152 | A1 * | 2/2005 | Gardner et al. | 422/186.3 |
| 2005/0116391 | A1 * | 6/2005 | Lindemann et al. | 264/497 |

FOREIGN PATENT DOCUMENTS

EP 1 010 493 A 6/2000

OTHER PUBLICATIONS

Patent Abstracts of Japan—vol. 017, No. 395 (Jul. 23, 1993); JP 05 077081 A, Mitsubishi Electric Corp., Mar. 30, 1993.
Patent Abstracts of Japan—vol. 009, No. 098 (Apr. 27, 1985); JP 59 223191 A, Mitsubishi Heavy Ind Ltd., Dec. 14, 1984.

(Continued)

*Primary Examiner*—M. Alexandra Elve
(74) *Attorney, Agent, or Firm*—Ralph D'Alessandro; Keith A. Roberson

(57) ABSTRACT

An inert gas dispenser for mounting to a process equipment functional window is provided to dispense an inert gas in a laminar flow at an effective velocity across the exposed surface to form a curtain of inert gas across the exposed surface to prevent a build-up of chemical by-product from the powder material during laser sintering. The gas flow rate is characteristic of a flow geometry having a Reynolds number below the turbulent range. The diffuser is used in a laser sintering system.

23 Claims, 3 Drawing Sheets

OTHER PUBLICATIONS

Figure 1:
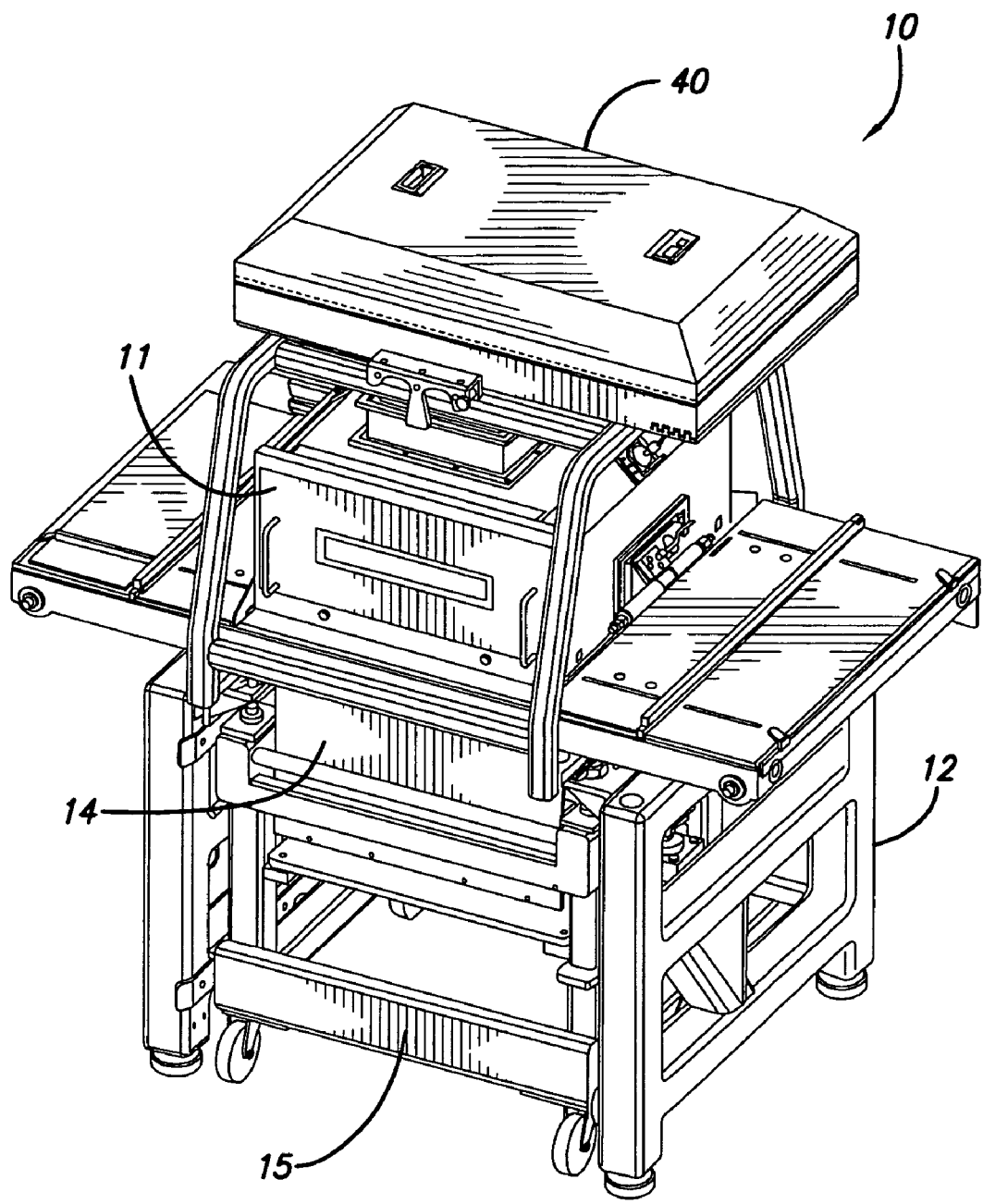

European Search Report EP 1721725 A1 dated Jun. 30, 2006 for European Application EP06009533; pp. 11-13.

DTM The Sinterstation® System 2000 "Guide to Mateirals Nylon Compounds: ProtoForm Composite (LNC-7000), LN-4010, and LNF-5000, including cover page, contents, pages marked " About Nylon-7 through Nylon Problems-10. Particular attention should be given to the page marked "About Nylon-8."".

* cited by examiner

LASER SINTERING PROCESS CHAMBER GAS CURTAIN WINDOW CLEANSING IN A LASER SINTERING SYSTEM

BACKGROUND OF THE INVENTION

The invention relates generally to a method of rapid prototyping and manufacturing and, more particularly, to laser sintering and the ability to prevent the build up of monomers and oligomers that condense and solidify in the form of films or larger crystals on windows within the process chamber during laser sintering operations.

Rapid prototyping and manufacturing (RP&M) is the name given to a field of technologies that can be used to form three-dimensional objects rapidly and automatically from computer data representing the objects. In general, rapid prototyping and manufacturing techniques build three-dimensional objects, layer-by-layer, from a working medium utilizing sliced data sets representing cross-sections of the object to be formed. Typically an object representation is initially provided by a Computer Aided Design (CAD) system. RP&M techniques are sometimes referred to as solid imaging and include stereolithography, ink jet printing as applied to solid imaging, and laser sintering.

A laser sintering apparatus dispenses a thin layer of heat-fusible powder, often a fusible polymer powder, polymer coated metal, or ceramic, across a process chamber to create a bed of the powder. The laser sintering apparatus then applies thermal energy to melt those portions of the powder layer corresponding to a cross-section of the article being built in that powder layer. The article is formed within a mass of powder commonly referred to as the "part cake." Lasers typically supply the thermal energy through modulation and precise directional control to a targeted area of the powder layer. Conventional selective laser sintering systems, such as the Vanguard™ system available from 3D Systems, Inc., use carbon dioxide lasers and position the laser beam by way of galvanometer-driven mirrors that deflect the laser beam.

The part cake is supported on a moveable build platform upon which the bed of powder is disposed. After a powder layer is fused, the build platform moves downward by an incremental distance and the apparatus then dispenses across the powder bed an additional layer of powder onto the previously fused layer and repeats the process of melting and selective fusing of the powder in this next layer. Fused portions of later layers fuse to fused portions of previous layers as appropriate for the article, until the article is complete. These articles are sometimes referred to as "built parts." Each additional layer of powder is typically dispensed from a powder feed system that dispenses a measured amount of powder onto the powder bed. A powder spreader, such as a blade or roller then picks up and spreads the powder over the powder bed in a uniform manner.

Detailed descriptions of laser sintering technology may be found in U.S. Pat. Nos. 4,863,538; 5,132,143; and 4,944,817, all assigned to Board of Regents, The University of Texas System, and in U.S. Pat. No. 4,247,508 to Housholder.

Generally, once the part is built it remains within the process chamber under an inert atmosphere until the newly formed part has cooled. Cooling may require several hours or days, depending upon the size and number of parts being built in a single build.

The most common powder material utilized in laser sintering systems is a nylon polyamide. Because the laser sintering process is a thermally based process the heat generating laser used to fuse the powder material together generates chemical by-products during the process. These by-products are volatile monomers and oligomers that vaporize and condense on the cooler surfaces on the interior of the process chamber. Especially susceptible to the build-up of these chemical by-products are the process functional equipment glass windows on the interior and ceiling of the process chamber. The build-up can be in the form of a thin film or frost-like crystals. The build-up of chemical by-products on process chamber exposed surface of the laser window is especially problematic because over a relatively short period of time the laser power delivered to the powder bed can be attenuated by as much as 50% in areas with film build-up and by as much as 71% in areas with frost-like crystalline build-up. Other process equipment functional windows within the process chamber that can become obstructed with chemical by-product build-up include the IR sensor window and IR camera window for which any attenuation of the IR signal between the powder part bed and the sensing devices can cause catastrophic loss of thermal control during the laser sintering process. If a video camera is employed to film the build process, that process functional window can also become obstructed and prevent effective filming from occurring over time.

This chemical by-product build-up has been long recognized as a problem by laser sintering system manufacturers and users. As early as 1994 DTM Corporation installed a heated nitrogen flow from a plurality of small orifices about the circular laser window ring across the laser and IR sensor windows in an unsuccessful attempt to stop this build-up of chemical by-products, especially in laser sintering systems using nylon polyamide powder material. U.S. Pat. No. 5,876,767 describes a laser sintering apparatus having a radial nozzle outlet orifice about the entire laser window ring that discharges a stream of nitrogen to stroke across the entire image-side surface of the circular laser window lens radially inwardly in an attempt to prevent monomers produced when solidifying the powder from precipitating on the lens. This approach encountered the same problems as the earlier DTM Corporation approach. Both approaches were further hampered by the fact that the relatively high flow rate of inert gas. In both prior approaches the inert gas flows create turbulence so that powder dust particles that float within the process chamber are entrained in the inert gas flow and adhere to the process chamber exposed surface of the windows when the gas flow impacts the window or lens.

Thus, there exists a need for an effective approach in a laser sintering apparatus to minimize the build-up of chemical by-products on the process chamber exposed surfaces of process equipment functional windows. These problems are solved in the design of the present invention.

BRIEF SUMMARY OF THE INVENTION

It is an aspect of the present invention that a laser sintering system having an improved design to minimize the build-up of chemical by-products of the laser sintering process on the process chamber exposed surfaces of process equipment functional windows.

It is another aspect of the present invention that a curtain of velocity controlled, laminar flow, temperature controlled, clean inert gas is provided that passes parallel to the process chamber exposed surface of process equipment windows.

It is another aspect of the present invention that the flow of inert gas that is fed from a discharge orifice over the exposed surface of a process equipment functional window has a specific Reynolds number characteristic of the flow geometry of about 200 or less.

It is a feature of the present invention that the laminar flow of clean inert gas spreads and blankets exposed surfaces of the process equipment functional windows in the process chamber to minimize volatile gas chemical by-products from coming into direct contact with the exposed window surfaces.

It is another feature of the present invention that the temperature of the inert gas is warm enough so as to not promote condensation or precipitation of volatile chemical by-products on the exposed surfaces of the process equipment functional windows, but that it is not hotter than the condensation temperature of the undesired chemical products.

It is a further feature of the present invention that the temperature of the inert gas flowing across the exposed surface of the process equipment functional windows is within the range of 50° C. to about 180° C.

It is further another feature of the present invention that the inert gas flowing across the exposed process equipment functional windows is at a flow rate of about 10 liters per minute or less and a velocity of about 3.6 meters per second or less.

It is yet another feature of the present invention that an inert gas diffuser is mounted to the frame of the process equipment functional window with an elongated discharge opening that is effective to change the direction of flow from being transverse to the exposed surface to parallel to the exposed surface as the gas enters the process chamber.

It is still another feature of the present invention that the inert gas diffuser has a discharge orifice that is elongated and narrow in shape and is sealingly mounted against the exposed surface of the process equipment window and to the window frame, spanning an arc that is less than half the circumference of the circular process equipment functional window.

It is an advantage of the present invention that the build-up of film-like coating deposits and frost-like crystalline deposits on the exposed surface of process equipment functional windows is minimized.

It is another advantage of the present invention that loss of thermal control during the laser sintering process is avoided by use of the inert gas diffuser mounted to process equipment functional windows.

These and other aspects, features, and advantages are obtained by the discharge orifice from an inert gas diffuser that provides a curtain of velocity controlled, laminar flow, temperature controlled, clean, inert gas parallel to the process chamber exposed surface of process equipment windows with a Reynolds number characteristic of the flow geometry to minimize the build up of chemical by-products during the laser sintering process.

BRIEF DESCRIPTION OF THE SEVERAL VIEWS OF THE DRAWING(S)

Figure 2:
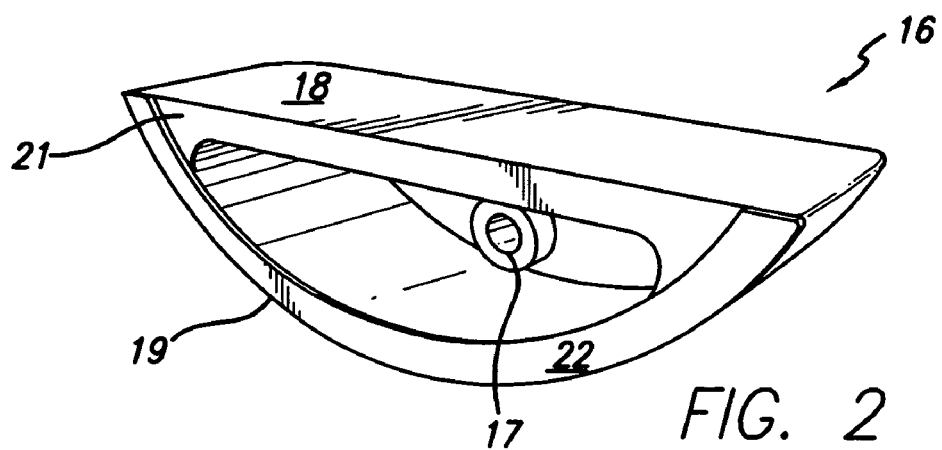
Figure 3:
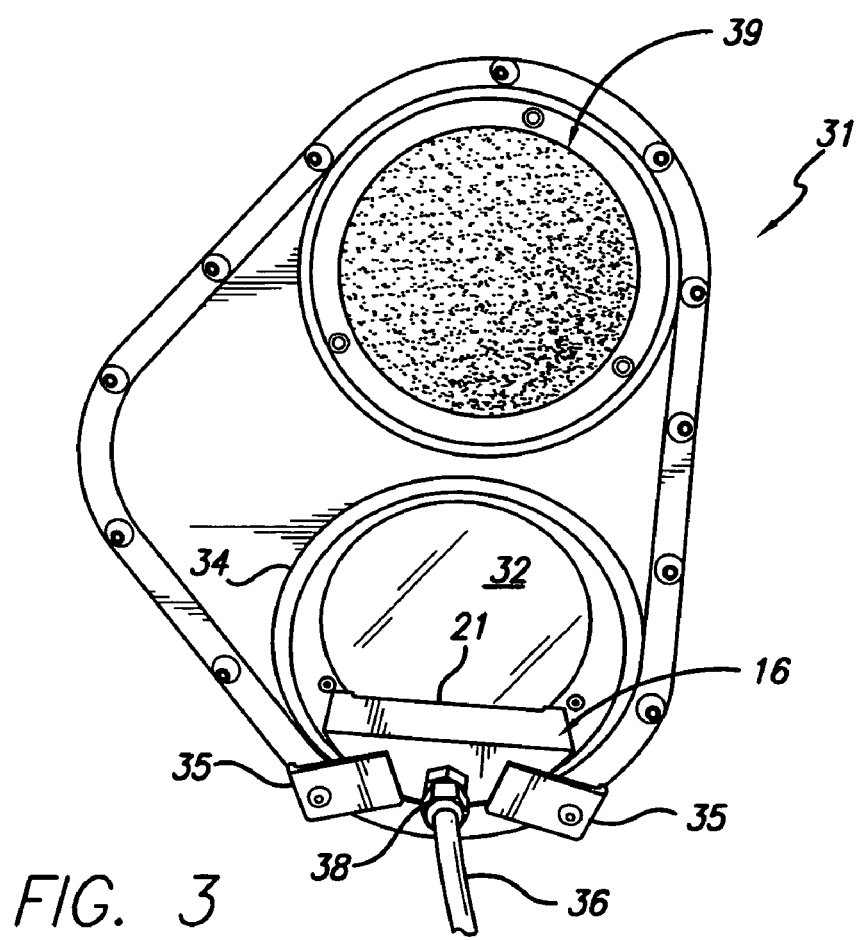
Figure 4:
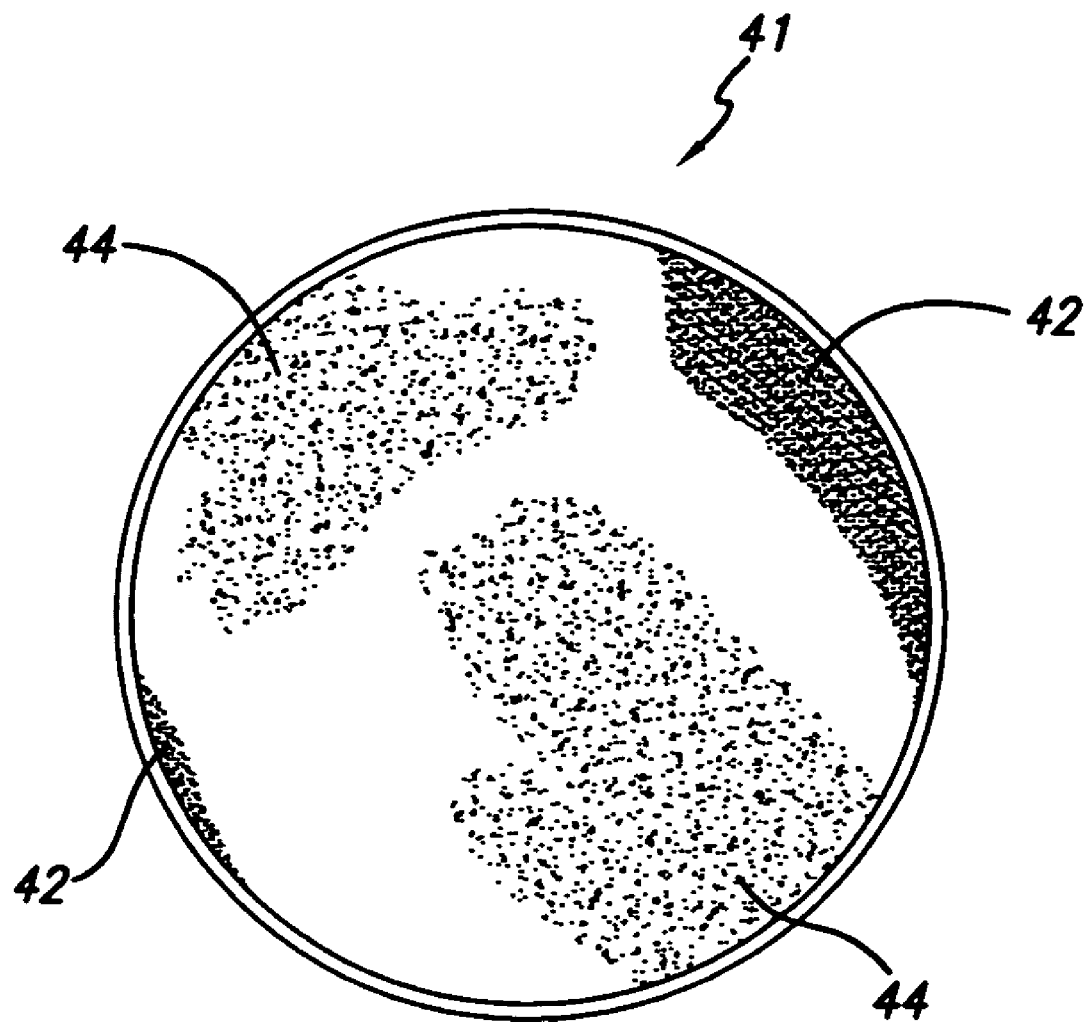

These and other aspects, features and advantages will become apparent upon consideration of the following detailed description of the invention, especially when taken in conjunction with the accompanying drawings wherein:

FIG. 1 is a perspective view of a laser sintering system employing the inert gas diffuser;

FIG. 2 is a perspective view of the inert gas diffuser showing the inlet orifice and an elongated, narrow discharge opening; and FIG. 3 is a bottom plan view of a portion of the ceiling of a process chamber showing laser window with the inert gas dispenser mounted about the frame; and FIG. 4. is a diagrammatic illustration of the build up of film and frost-like crystalline particles on the exposed surface of a laser window employing prior art system.

DETAILED DESCRIPTION OF THE INVENTION

A laser sintering apparatus or system having a removable build chamber is illustrated in FIG. 1 indicated generally by the numeral 10. The laser sintering system 10 includes a process chamber 11, an associated support housing 12, and a removable build chamber 14 that may be supported by a build carriage 15. The build carriage 15, along with the build chamber 14, may be removably inserted into the support housing 12. In some embodiments, the laser sintering apparatus 10 may include a lifting device (not shown in FIG. 1) that is adapted to move the build chamber 14 between a load position and a build position. As used herein, the term "build position" refers to the position of the build chamber 14 wherein the build platform is properly aligned with the powder bed such that vertical travel of the build platform is substantially perpendicular to the powder bed. In the build position the laser sintering apparatus 10 is ready to build parts. The lifting device can comprise hydraulic or pneumatic cylinders, electric motors, or the like. The laser sintering system 10 also includes an associated laser unit 40 that includes the laser and associated mechanisms for generating and targeting a laser beam within the process chamber 11.

The build chamber 14 may also include a plurality of alignment surfaces (not shown) that are each adapted to releasably engage a corresponding surface on the support housing. As the build chamber 14 is moved into the build position, the alignment surfaces engage the corresponding surfaces on the support housing 12 and position the build chamber 14 so it is properly aligned with the process chamber 11. The design and operation of the removable build chamber is described in greater detail in co-pending U.S. patent application Ser. No. 11/088,133 filed Mar. 23, 2005 and assigned to the assignee of the present invention.

The process chamber 14 includes a powder bed (not shown) and an associated powder dispensing system having a powder material feed hopper and feed mechanism (both also not shown). The process chamber 11 also includes a powder material spreader preferably in the form of a counter-rotating roller (not shown) that is adapted to pick up and spread the dispensed powder material over the powder bed in a uniform manner. The powder bed may include an opening that is adapted to removably receive the build chamber within process chamber 11. In the context of the invention, the term "powder spreader" includes rollers, wipers, doctor blades, or any other suitable device that may be used for spreading the powder across the powder bed in a uniform manner.

The build chamber 14 includes a build cylinder (not shown) having a moveable build platform (also not shown). The process chamber 11 may also include one or more overflow receptacles (also not shown) that are adapted to receive any excess powder during the powder material spreading operation. In operation, the powder material spreader spreads the powder material across the surface of the powder bed and deposits a discrete layer of powder material onto the surface of the moveable build platform to form the part cake. As used herein, the term "part cake" refers to the layer(s) of heat-fusible powder, including the sintered powder and unfused powder, that has been deposited onto the surface of the build platform. The build platform may be controlled by a motor (not shown) to move downwardly below the powder bed in small incremental steps, for example 0.125 mm, to define the thickness of each layer of the powder material to be processed. The motion is not limited to unidirectional motion, e.g. a downward motion of 0.500 mm followed by an upward motion of 0.375 mm will result in a final downward position that is 0.125 mm lower than the last step. Typically, the build platform is moveable within the build cylinder along an axis of vertical travel (not shown).

Preferably, the powder bed defines a horizontal plane that is substantially perpendicular to the vertical travel of the build platform in the build cylinder when the build chamber 14 is properly positioned and aligned in the build position. As used herein, the term "vertical travel" refers to the movement of the build platform as it moves within the build cylinder. Proper alignment of the powder bed with the vertical travel of the build platform throughout the build cycle is necessary to ensure that the part is not distorted. For example, during a build operation, the dispensing system dispenses a measured amount of powder material onto the powder bed. The powder material spreader then traverses across the powder bed one or more times distributing a uniform layer of powder across the surface of the build platform to form the part cake. If the vertical travel of the build platform is not properly aligned with the surface of the powder bed or becomes improperly aligned, each resulting layer of fused powder material formed on the build platform may be off-set from the nominal or expected position of the layer. As a result, the dimensions of a part built thereon may be distorted, which may cause the part to be unusable.

The build chamber 14 is positioned within the laser sintering system 10 by being moved upwardly in the direction of the process chamber 11. Continued upward movement of the build chamber 14 causes the alignment surfaces on both the build chamber 14 and the support housing 12 to contact each other and align the build platform with the powder bed and an opening (not shown) in the powder bed. The process chamber 11 may also include a seal for creating a sealing relationship between the powder bed and the build cylinder. Typically, the seal comprises a heat resistant elastomeric material that is effective to prevent the powder material from passing between the interface of the powder bed and the build cylinder and to contain the inert gas atmosphere.

A laser and its associated targeting mechanisms are mounted in a unit 40, as shown in FIG. 1, above the process chamber 11. The build chamber 14 is preheated prior to insertion into housing 12 and engagement with process chamber 11. Heaters (not shown) within process chamber 11 help maintain the appropriate temperature and atmospheric conditions for the fabrication of a three-dimensional part. The atmosphere typically comprises an inert gaseous atmosphere, such as nitrogen. The system also includes an associated computer system (not shown) that is configured to operate the laser and its associated optics system. Typically, the computer may be programmed with information indicative of the desired boundaries of a plurality of cross sections of the part to be produced.

After the process chamber 11 and build chamber 14 have been joined, a laser beam is generated by a laser (both not shown), and aimed at the target surface or area by way of a scanning system (also not shown) that generally includes galvanometer-driven mirrors that deflect the laser beam. The term "target area" refers to the top surface of the part cake. The laser and galvonmeter systems are normally isolated from the process chamber 11 by a laser window. The process chamber 11 includes one or more radiant heaters (not shown) that heat the part cake and an area of the powder bed adjacent to the part cake. The deflection and focal length of the laser beam may be controlled, in combination with modulation of the laser, to direct laser energy to those locations of the fusible powder layer corresponding to a cross-section of the part to be formed in that layer.

The process chamber 11 includes a powder dispensing system comprising a single powder feed hopper with a feed mechanism controlled by a motor (not shown) to control the amount of powder dropped onto the powder bed below. The feed mechanism may be of several types including, for example, a star feeder, an auger feeder, or a rotary drum feeder. In some embodiments, the powder dispensing system may comprise one or more feed pistons that are disposed within the build chamber. In this last embodiment, one or more feed piston(s) push up a measured amount of powder into the powder bed. Thereafter, the powder spreader picks up and spreads the powder over the powder bed and build platform in a uniform manner. In another alternative embodiment, the powder feed system may comprise a reciprocatable overhead hopper system having a blade attached to the bottom of the hopper opening to deliver and then spread the powder.

As previously stated, powder spreader preferably comprises a counter-rotating roller driven by a motor (not shown) that spreads powder from a powder wave across the laser target area. In some embodiments, the powder spreader carries any residual powder material not deposited on the target area into overflow mechanisms (not shown) that may be disposed at opposing ends of the process chamber 11. Although the use of a counter-rotating roller is preferred, the powder material can be spread by other means including a wiper or doctor blade. In some embodiments, the powder spreader may comprise a leveling roller having a transverse axis that extends laterally across the surface of the roller. When the build chamber 14 is positioned in the build position, the plane defined by the travel of the powder spreader across the powder bed is substantially perpendicular to the vertical travel of the build platform. Substantially perpendicular as used herein means that the some deviation from ninety degrees is permitted provided that the dimensional accuracy of the part being built remains acceptable.

During the laser sintering process the heat in the process chamber and the action of the laser cause chemical by-products from the powder material, such as nylon polyamide, to vaporize and condense on the cooler interior surfaces of the process chamber 11. Where process equipment functional windows or clear glass surfaces are employed these by-products build-up in undesirable thin films or frost-like crystalline particles after condensing on the surfaces. Powder material dust particles in the process chamber atmosphere can also become entrained in gas streams impinging on these windows causing the particles to adhere. This build-up obstructs the window and can have the detrimental effect of attenuating the power of the laser striking the powder bed part cake or the signal of an IR sensor. These can have severe consequences during a laser sintering process by reducing the effectiveness of the laser to fuse powder material as the laser window become fogged or obstructed with a film of chemical by-product or an accumulation of frost-like crystalline particles. Obstruction of the process chamber exposed windows for the IR sensors and the IR camera can have catastrophic consequences by destroying the thermal control of the laser sintering process and result in failed builds. Failed builds can manifest themselves in melted down parts or blocks of powder material that are entirely fused together.

FIG. 2 illustrates an inert gas dispenser in the form of a diffuser indicated generally by the numeral 16. Diffuser 16 is a housing that includes a gas inlet orifice 17, a flat first side 18, and an arcuate opposing second side 19. The first side 18 is of a length that is less than the arcuate opposing second side 19 so that the first side 18 is recessed from the exposed surface of a process equipment functional window, such as laser window 32 shown briefly in FIG. 3. This recess creates a recessed discharge opening 21 that is parallel to the exposed surface of the window permits the flow of a clean inert gas, preferably nitrogen, to be directed across the exposed surface of the process equipment functional window. As shown the recessed discharge opening 21 is about 0.7 mm high and about 60-70 mm wide. The arcuate opposing second side 19 has a sealing surface 22 that seats against and seals to the exposed surface of the process equipment functional window when diffuser 16 is installed. This creates the arrangement seen in FIG. 3.

Although the specific dimensions and geometric shape of the diffuser 16 can vary, the recessed discharge opening 21 must be sized to create a gas flow that remains below the specific Reynolds number characteristic of the flow geometry to avoid transitioning from laminar flow to turbulence. In the embodiment shown in FIGS. 2 and 3, the inert gas is fed from inlet orifice 17, initially flowing in a direction transverse to the exposed surface of the process equipment functional window into the diffuser 16 where the direction of flow is changed and the gas is dispensed from the elongated and narrow recessed discharge opening 21. The inert gas is dispensed in a laminar flow at a controlled velocity across the exposed surface to form a curtain of nitrogen gas that blankets the exposed surface and prevents or minimizes a build up of undesired chemical by-product from the powder material being laser sintered. The nitrogen gas is dispensed at a temperature that is less then the condensation temperatures of chemical by-products that are typically above about 180° to 200° C. The temperature of the gas being dispensed is kept within the range of about 500 to about 180° C.

The nitrogen gas is dispensed in a laminar flow across the exposed surface of the window at a flow rate of less than about 10 liters per minute, more preferably about 7 liters per minute, and most preferably about 5 liters per minute and a velocity of about 3.6 meters per second, more preferably about 2.5 meters per second, and most preferably about 1.8 meters per second. This flow rate is low enough so that the velocity is such that the flow of inert gas out of the discharge orifice 21 of diffuser 16 stays below the Reynolds number for this flow geometry that maintains the inert gas flow as laminar and the flow does not become turbulent. The gas flow speed does not exceed the point at which the viscous or diffusive dissipation can no longer stabilize the flow where the laminar flow transitions to turbulent flow. The discharge orifice for any discharge orifice size and geometry must maintain an inert gas flow with a Reynolds number characteristic of the flow geometry of less than 200, more preferably less than 140, and most preferably less than 100 to prevent of minimize the build-up of undesired chemical by-products on windows surfaces exposed to the process chamber during laser sintering. The Reynolds number for flow through a pipe is given by the equation $Re=\rho VD/\mu$, where $\rho$ is the density of the fluid, V the average flow velocity, D the pipe diameter, and $\mu$ the viscosity of the fluid. For the specific size and geometry of the discharge orifice 21 shown in FIG. 2, the height of the elongated, narrow slit opening was used in place of the diameter and Re was determined to be 94 for a flow rate of 5 liters per minute and a velocity of 1.8 meters per second. This same approach is to be used to determine the Reynolds number for any narrow slit orifice geometry. As a result of the lack of turbulent flow, powder material dust particles suspended in the atmosphere of the process chamber are not entrained in the inert gas flow and do not adhere to the exposed surface of the window.

As shown in FIG. 3, a window module 31 includes a laser window 32 and an IR camera window 39. Laser window 32 is retained by a frame 34 and utilizes clamps 35 to install and maintain the diffuser 16 in contact with the exposed surface of laser window 32. The recessed discharge opening 21 dispenses the laminar flow of nitrogen gas received from gas line 36 through coupling 38. As illustrated in FIG. 3, the laser window 32 is clear, but the IR camera window without the diffuser 16 is seen as having obstructions in the form of frost-like crystalline particles adhered to its surface.

FIG. 4 illustrates a prior art laser window indicated generally by the numeral 41 that is obstructed by chemical by-products on its process chamber exposed surface. As indicated, chemical by-product films 42 have been found to attenuate as much as fifty percent of the power transmitted by the laser beam through the window. The frost-like crystalline particle areas of build up 44 have been found to attenuate as much as seventy-one percent of the laser beam power directed through the window to the powder bed in the part cake.

Diffuser 16 can be employed in any process equipment functional window including the laser window illustrated herein, as well as IR sensor windows, IR camera windows, and video camera windows, as appropriate.

While the invention has been described above with references to specific embodiments thereof, it is apparent that many changes, modifications and variations in the materials, arrangements of parts and steps can be made without departing from the inventive concept disclosed herein. For example, although the process equipment functional windows have been shown and described as being circular in shape, it is to be understood that any appropriate geometric shape could be employed with the inert gas dispenser of the present invention, allowing for the required change in shape to ensure suitable contact with the mating surface is achieved. Similarly, and more importantly, the discharge orifice could be any appropriate size and geometric shape, such as oval, triangular, rectangular, pentagonal or other polygonal shape, as long as the flow of inert gas therefrom is such that the Reynolds number characteristic for the flow geometry is below that which is in the turbulent range. The discharge orifice could also be a plurality of small openings with the proper flow rate to ensure a gas flow across the exposed window surface in the laminar range. The inert gas flow must remain laminar beyond the discharge orifice across the exposed window surface. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. In an apparatus for forming a three-dimensional object layer-by-layer from a powder material by laser sintering comprising in combination:
   a. a process chamber having a floor, a movable support platform co-operative with the floor, two opposing ends and a ceiling;
   b. a powder material feeder to controllably feed a powder material to the process chamber from a source of material;
   c. a powder spreader movably mounted to the apparatus and cooperative with the material feeder to spread powder material across the floor to form a powder bed between the two opposing ends;

d. a laser energy source effective to selectively deliver laser energy to material in the powder bed supported by the support platform to fuse the powder material to form a three-dimensional object;

e. at least one laser window having a surface exposed to the process chamber and being mounted in a window frame, wherein the laser energy source delivers the laser energy through the laser window;

f. a source of inert gas feeding the inert gas in a direction of flow to the exposed surface of the laser window; and g. an inert gas dispenser comprising a discharge orifice that is mounted to at least one of the exposed surface and the window frame, wherein the discharge orifice dispenses an inert gas in a laminar flow at an effective velocity across the exposed surface to form a curtain of inert gas across the exposed surface and at a flow rate having a Reynolds number characteristic of the flow geometry of less than 200 effective to minimize the build-up of chemical by-product from the powder material on the exposed surface of the laser window during laser sintering.

2. The apparatus according to claim 1 further comprising the discharge orifice dispensing the inert gas at a flow rate having a Reynolds number characteristic of the flow geometry of less than 140.

3. The apparatus according to claim 1 further comprising the discharge orifice defining a plurality of small openings.

4. The apparatus according to claim 1 further comprising the dispenser being arcuate and sealingly mounted against the exposed surface and to the frame.

5. The apparatus according to claim 4 further comprising the dispenser changing the direction of flow of the inert gas from transverse to the exposed surface to parallel to the exposed surface.

6. The apparatus according to claim 4 further comprising the discharge orifice having a first side and an opposing arcuate second side, the first side being of a length less than a length of the opposing arcuate second side so that the first side is recessed from the exposed surface of the laser window when the dispenser is mounted against the exposed surface.

7. The apparatus according to claim 1 further comprising the inert gas being nitrogen gas.

8. The apparatus according to claim 7 further comprising the laser window including at least one of an IR sensor window, an IR camera window and a video camera window.

9. The apparatus according to claim 7 further comprising the nitrogen gas being dispensed in a laminar flow at a temperature less than the condensation temperature of the chemical by-product from the powder material.

10. The apparatus according to claim 9 further comprising the nitrogen gas being dispensed at a temperature in the range of 50° C. to about 180° C.

11. The apparatus according to claim 1 further comprising the discharge orifice being elongate.

12. In a laser sintering apparatus having a process chamber with a floor and a ceiling, a source of powder material, a powder material spreader to spread powder across the process chamber floor, a laser energy source to selectively fuse the powder material layer-by-layer; at least one laser window mounted to a window frame and having a surface exposed to the process chamber, a source of inert gas feeding the inert gas in a direction of flow to the exposed surface, the improvement comprising:

at least one inert gas dispenser comprising a discharge orifice that is mounted to at least one of the exposed surface and the window frame, wherein the discharge orifice dispenses a laminar flow of gas across the exposed surface at an effective velocity and a flow rate having a Reynolds number characteristic of the flow geometry of less than 200 effective to minimize the build-up of chemical by-product from the powder material on the exposed surface of the laser window during laser sintering.

13. The apparatus according to claim 12 further comprising the discharge orifice dispensing the inert gas at a flow rate having a Reynolds number characteristic of the flow geometry of less than 140.

14. The apparatus according to claim 12 further comprising the discharge orifice defining a plurality of small openings.

15. The apparatus according to claim 12 further comprising the laser window being generally circular with a circumference and mounted in a frame.

16. The apparatus according to claim 15 further comprising the dispenser being arcuate and sealingly mounted against the exposed surface and to the frame, the dispenser spanning an arc that is less than half the circumference.

17. The apparatus according to claim 16 further comprising an arcuate discharge orifice having a first side and an opposing arcuate second side, the first side being of a length less than a length of the opposing arcuate second side so that the first side is recessed from the exposed surface of the laser window when the dispenser is mounted against the exposed surface.

18. The apparatus according to claim 17 further comprising the dispenser changing the direction of flow of the inert gas from transverse to the exposed surface to parallel to the exposed surface.

19. The apparatus according to claim 12 further comprising the inert gas being nitrogen gas.

20. The apparatus according to claim 19 further comprising the laser window including at least one of an IR sensor window, and IR camera window and a video camera window.

21. The apparatus according to claim 19 further comprising the nitrogen gas being dispensed in a laminar flow at a temperature less than the condensation temperature of the chemical by-product from the powder material.

22. The apparatus according to claim 21 further comprising the nitrogen being dispensed at a temperature in the range of 50° C. to about 180° C.

23. The apparatus according to claim 12 further comprising the discharge orifice being elongate.

* * * * *